C. E. QUEEN.
BELT FASTENER FOR MACHINERY AND THE LIKE.
APPLICATION FILED FEB. 17, 1917.
1,248,709.
Patented Dec. 4, 1917.
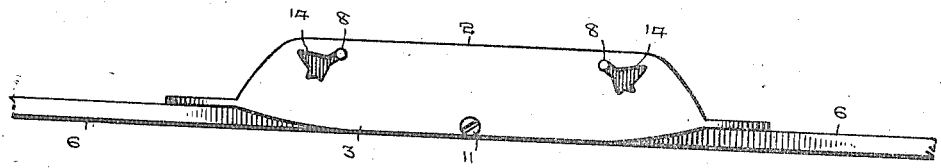
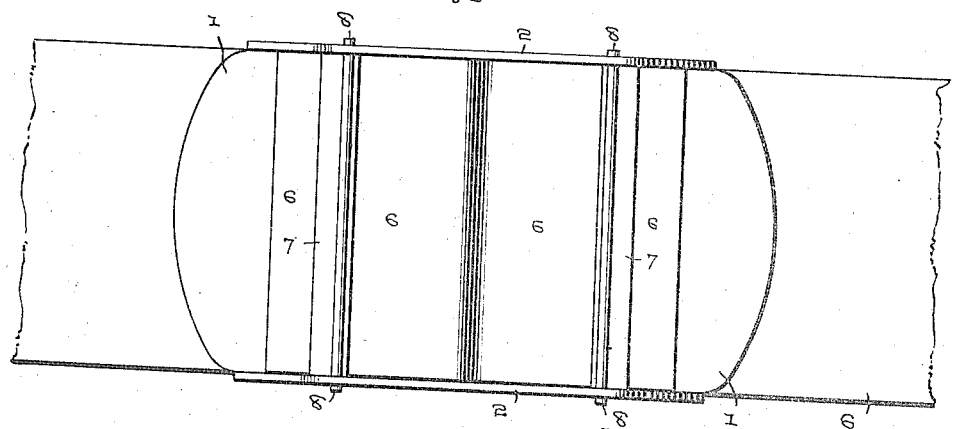
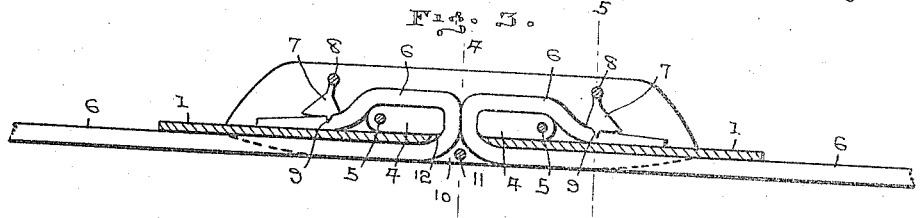
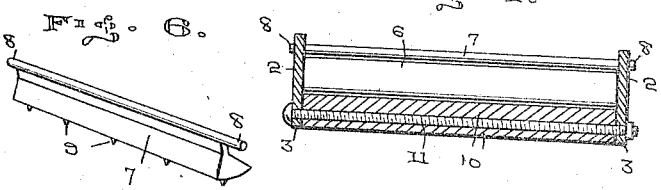
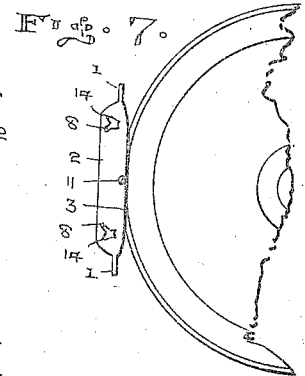
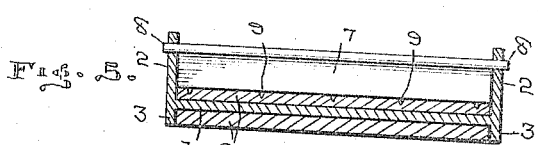
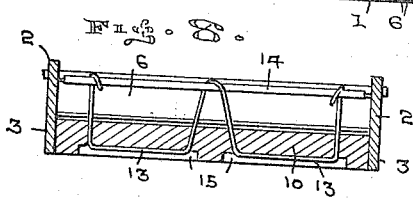
Inventor
Charles E. Queen
By W. J. FitzGerald &Co.
Attorneys

UNITED STATES PATENT OFFICE.

CHARLES E. QUEEN, OF ROCK CAVE, WEST VIRGINIA.

BELT-FASTENER FOR MACHINERY AND THE LIKE.

1,248,709.

Specification of Letters Patent.   Patented Dec. 4, 1917.

Application filed February 17, 1917.   Serial No. 149,307.

*To all whom it may concern:*

Be it known that I, CHARLES E. QUEEN, a citizen of the United States, residing at Rock Cave, in the county of Upshur and State of West Virginia, have invented certain new and useful Improvements in Belt-Fasteners for Machinery and the like; and I do hereby declare the following to be a full, clear, and exact description of the invention, such as will enable others skilled in the art to which it appertains to make and use the same.

My invention relates to belt fasteners and particularly to joining the ends of belts for machinery so that said ends will be very securely held in relation to each other without reference to the strain placed thereon incident to the use upon pulley wheels, and the like, and the object of my invention is to provide reliably efficient means for securing the ends of the belting together, whereby when desired said ends may again be quickly released.

A further object of my invention among others is to make it possible to readily disconnect or release the ends of the belting and take up any slack therein.

Other objects and advantages will be hereinafter made clearly apparent, reference being had to the accompanying drawings which are made a part of this application and in which, Figure 1 shows a side elevation of my belt securing means.

Fig. 2 is a plan view of the outer side thereof ready for use.

Fig. 3 is a central sectional view of my securing appliance showing the ends of the strap disposed therein.

Fig. 4 is a transverse central sectional view of Fig. 3 indicated by dotted line 4—4.

Fig. 5 is a sectional view of Fig. 3, as indicated by dotted line 5—5.

Fig. 6 is a perspective detail of the clamping member.

Fig. 7 shows my belt securing appliance as when passing around a pulley wheel.

Fig. 8 is a vertical transverse sectional view taken on the line 4—4 of Fig. 3 and showing another means for clamping the filling member in position.

For convenience of description, the various details of my invention and coöperating accesories will be designated by numerals, the same numeral applying to a corresponding part in the several views.

In materializing my invention I provide a frame or body section 1 of suitable sheet metal, casting, forging, or the like, having the side members 2, said side members also extending downward to provide the lips 3, usually of sufficient length or reach to correspond with the thickness of the belting, as is obviously desirable.

Within the body or frame portion, thus or otherwise formed, I mount a pair of jaws 4, said jaws being pivoted upon the transversely disposed rods 5, whereby said jaws may be freely moved upward at their inner free ends when the ends of the belting 6 are introduced through an opening in the central part of the body, and it therefore follows that when the ends of the belting are thus introduced between said jaws and the free ends of said jaws forced downward in contact with the bottom or body section 1, the said belting ends will be tightly clamped between said jaws, and in order to further secure the free ends of the belting, they are each directed outward and disposed over the clamping members 7 which are also pivotally mounted upon the transverse rods 8, whereby the said clamping members may be freely moved outward and upward to freely receive the ends of the belting placed thereunder.

It follows therefore that when the free end of the belting is placed under its respective clamping member 7, a pull upon the belting, incident to use, will cause the clamping members 7 to swing inward, thereby insuring that the plurality of teeth 9 upon said clamping members 7 will take into the contiguous part of the belting and tightly grip the same.

It is furthermore obvious that the greater the strain or pull upon the belting, will cause the clamping members 4 and 7 to more tightly grip the ends of the belt and insure that said ends will be held reliably in an adjusted position. Inasmuch as the body portion proper or plate 1 is not connected directly with the belt, it follows that when my belt fastener is passing around a pulley, the extreme outer ends of said body portion will rise out of contact with the belting, as indicated in Fig. 7 of the drawing.

I also provide the filling member 10, designed to occupy the V-shaped space at the meeting ends of the belt, as indicated in Figs. 3 and 4, said filling being held in place by the rod or screw member 11, it being very desirable and important to provide these parts in order to insure the most perfect and satisfactory results.

By reference to Fig. 3, it will be seen how tightly and securely the free ends of the belting are secured and held in place after they have passed through a suitable slot or opening 12 formed in the central portion of the body member 1, and it is obvious that the greater the strain upon the belting, the more tightly will the clamping members 7 and the teeth 9 carried thereon press into the strap members and insure a most perfect union of the free end until it is desired to release the same. It follows therefore that the ends of the belting may be very quickly released by causing the clamping members 7 to move outwardly and upwardly. The rods 8 are preferably received by a suitable aperture in one of the side members 2, while the other is received by a special form of opening 14, whereby the end of the rod 8 may be easily moved outward and incidentally cause the clamping jaw to rise to any desired point when releasing or receiving the free end of the belting.

In Fig. 8 of the drawings, will be seen another way in which the filling member 10 may be securely clamped and held in position. This clamping or holding means, in this instance, consists of a flexible or pliable wire 13 which is extended upwardly through the filling member and has its intermediate portion and its terminal ends looped around and attached to a rod 14 that is arranged in the crotch formed by the meeting ends of the belt. The filling member 10 is provided longitudinally and centrally with slits 15 in which are seated the inner portions of the wire 13 so that they will in no way come in contact with the surface over which the belt is traveling.

It will thus be seen that I have provided reliably efficient means for detachably connecting the ends of machinery belting and the like, and believing that the advantages and manner of using the same have thus been made clearly apparent, further description is deemed unnecessary.

What I claim and desire to secure by Letters Patent is:—

1. The herein described clamping member or belt fastener for machinery and the like, consisting of a body portion having oppositely and outwardly extending side flanges, said body portion having a central opening to receive the ends of the belting, clamping jaws pivotally mounted within said body portion whereby their free ends will terminate near said central opening, a clamping member pivotally mounted near each end of the body portion in the side flanges thereof, said clamping members each having a plurality of teeth to engage the surface of the belting disposed thereunder, and a filling member arranged in the crotch formed by the meeting ends of the belt, and means to hold said filling in place.

2. A belt fastener consisting of a body portion having oppositely and outwardly extending side flanges, said body portion having a central opening to receive the ends of the belting, clamping jaws pivotally mounted on said body portion so that their free ends will terminate over said central opening, a clamping member pivotally mounted between the side flanges and outwardly of each clamping jaw, a filling member arranged in the crotch formed by the meeting ends of the belt on one side thereof, a rod arranged in the crotch formed by the meeting ends of the belt on the other side thereof, and a flexible element extended through the filling member between the opposed ends of the belt and having its terminal ends secured to said rod.

In testimony whereof I have signed my name to this specification in the presence of two subscribing witnesses.

CHARLES E. QUEEN.

Witnesses:
R. C. BOGGS,
H. A. BOGGS.

Copies of this patent may be obtained for five cents each, by addressing the "Commissioner of Patents, Washington, D. C."